United States Patent [19]
Rutz

[11] Patent Number: 5,394,595
[45] Date of Patent: Mar. 7, 1995

[54] METHOD AND APPARATUS FOR SHRINKING BIAXIALLY STRETCHED THERMOPLASTIC FILMS

[75] Inventor: Andreas Rutz, Lindau, Germany

[73] Assignee: Lindauer Dornier GmbH, Lindau, Germany

[21] Appl. No.: 117,500

[22] Filed: Sep. 7, 1993

[30] Foreign Application Priority Data

Sep. 4, 1992 [DE] Germany .......... 42 29 535.1

[51] Int. Cl.$^6$ .............................................. D06C 3/00
[52] U.S. Cl. .......................................... 26/73; 26/89; 26/93; 264/342 RE
[58] Field of Search ................... 26/73, 72, 71, 86, 89, 26/91, 93; 264/342 RE, 288.4, 289.6, 290.2

[56] References Cited

U.S. PATENT DOCUMENTS

| | | | |
|---|---|---|---|
| 3,046,599 | 7/1962 | Nicholas et al. | 26/73 |
| 4,614,011 | 9/1986 | Nicholas et al. | 26/93 |
| 4,637,103 | 1/1987 | Hutzenlaub | 26/73 |
| 4,890,365 | 1/1990 | Langer | 26/73 |
| 5,265,313 | 11/1993 | Rutz | 26/73 |

Primary Examiner—Clifford D. Crowder
Assistant Examiner—Any Brooke Vanatta
Attorney, Agent, or Firm—W. G. Fasse; W. F. Fasse

[57] ABSTRACT

A thermoplastic film web is subjected to a defined shrinking in a treatment apparatus with two mirror-symmetrically arranged tentering chains. For this purpose, each chain is equipped with tentering clamps that have a variable on-center spacing or pitch in the travel direction of the tentering chains, and which additionally are position adjustable in a direction other than the travel direction. The entire clamp body or clamp elements may be position variable in a direction other than the travel direction. In operation, the pitch is first reduced in the inlet and/or heating zone of the treatment apparatus. Simultaneously, the clamping position of the individual clamps or clamping element is changed, e.g. by tilting or lifting. The clamp position change takes up extra film web length resulting from the pitch change, whereby the film web assumes throughout its width a corrugated configuration. Then, the film web is cross-stretched. Then the position of the clamps or clamp elements is changed in the setting zone of the apparatus so that the film web is plane again, whereby the shrinking takes up the corrugations. Then, the clamps release the film web and thereafter the original longer pitch is restored.

13 Claims, 4 Drawing Sheets

METHOD AND APPARATUS FOR SHRINKING BIAXIALLY STRETCHED THERMOPLASTIC FILMS

CROSS-REFERENCE TO RELATED APPLICATIONS

This application is related to U.S. Ser. No. 07/915,000, filed on Jul. 16, 1992, entitled: FILM STRETCHING MACHINE FOR SHRINKING OF PLASTIC FILMS; and to U.S. Ser. No. 07/915,416, filed on Jul. 17, 1992, and entitled: APPARATUS FOR A TENTERING CHAIN HAVING TENTERING CLAMPS WITH A CONTINUOUSLY VARIABLE PITCH BETWEEN TWO NEIGHBORING CLAMPING BODIES, now U.S. Pat. No. 5,265,313.

FIELD OF THE INVENTION

Biaxially stretched thermoplastic films are treated in a shrinking apparatus in which, as viewed in the travel direction of the film, an inlet zone or area is followed by a heating zone, a stretching zone, a setting zone, and a discharge area. The apparatus is also equipped with tentering chains having a variable pitch for transporting a film web.

BACKGROUND INFORMATION

In the shrinking of biaxially stretched film webs, it is possible to take advantage of the difference in length between a film web that already enters the treatment apparatus in corrugated wavy form and a film web that has a plane configuration as it enters the treatment apparatus. In the first instance where the entering web is corrugated or wavy, substantial difficulties have been encountered in the feeding of the corrugated film web into the entrance zone or area of the apparatus. On the one hand, the tentering clamps must have a configuration that takes the wavy shape of the film web into account. On the other hand, the tentering chain travelling speed must be smaller than the web feed-in speed in order to take into account the intended shrinking distance.

The above mentioned U.S. Ser. No. 07/915,000 (Rutz et al.), filed on Jul. 16, 1992, discloses a tentering chain with tentering clamps which are so tiltable that the clamps can clamp a corrugated film web. U.S. Ser. No. 07/915,416 (Rutz) filed Jul. 17, 1992 discloses a tentering chain with a variable pitch between neighboring tentering clamps.

In the second instance where the film web enters the treatment apparatus as a plane sheet, the film web must be corrugated or brought into a wavy shape within the treatment apparatus. The wavy shape is formed in the heated zone of the apparatus by an additional longitudinal stretching without changing the film web characteristics. In this approach there are no difficulties in feeding the plane film web into the apparatus. However, the application of the required stretching forces to the tentering clamps as they travel through the heating zone of the apparatus poses certain difficulties. U.S. application Ser. No. 07/915,000 (Rutz et al), on Jul. 16, 1992 discloses solutions for these problems.

The tiltable tentering clamps of U.S. Ser. No. 07/915,000 are even suitable for use in those instances where a plane film web needs to be fed into the treatment apparatus with a small pulling-in speed in the inlet zone of the apparatus. In U.S. Ser. No. 07/915,000 an incoming plane film web is gripped in the inlet zone of the apparatus by tentering clamps which have a clamp table and a clamp flap extending in parallel to the plane film web in the inlet zone. These tentering clamps are variable in their position for forming the corrugation. A pair of tentering clamps grips the edges of the entering film web between the table and flap and the clamps are caused to perform a motion when the clamping action is completed and even before the next pair of clamps grips the film edges further upstream of the web. The motion performed by the clamps or at least by the table and flap is preferably a tilting motion around an axis extending in parallel to the film travel direction. This procedure, however, is possible only if the tentering chains travel with a certain optimal speed which may not be too fast, because the control mechanism for the tilting of the tentering clamps must work very fast. Thus, at high speeds of the tentering chains, the control mechanisms for the clamp tilting are not quite suitable, since their required fast operation poses certain mechanical problems. Conventional tentering clamp guides which permit a shrinking of the film web by way of a pitch change of the pitch between neighboring tentering clamps on a tentering chain permit the feeding of the film web into the treatment apparatus without any problems. Incidentally, the term "pitch" as used herein means the on-center spacing between two neighboring tentering clamps along a tentering chain. However, tentering clamps that permit varying the pitch do not permit a positional change of the clamps in directions other than the travel direction. The pitch is changed in the travel direction. Further, problems occur in connection with the constructions that permit a pitch change due to the relatively high adjustment forces in the travel direction that are necessary when a change is made from a normal pitch T to the shrinking pitch t. This problem is aggravated by the fact that the pitch change must take place in areas along the tentering chain where the tentering chain is exposed to the maximum loads along its travelling length. Thus, all adjustment forces required for the pitch change must also be taken up by the adjustment mechanism for the pitch change. These adjustment mechanisms either are effective on the respective tentering clamp body or between two neighboring tentering clamp bodies along the tentering chain.

OBJECTS OF THE INVENTION

In view of the foregoing it is the aim of the invention to achieve the following objects singly or in combination:

to assure a well defined shrinking of the thermoplastic film web in biaxial directions while using small adjustment forces for the pitch change and for a positional change of the tentering clamps secured to a tentering chain;

to avoid the problems outlined above and to permit a pitch change in the travel direction and a positional change in directions other than the travel direction of the individual clamps without difficulties; and to construct an apparatus that will perform the well defined shrinking without overloading the tentering clamps nor the adjustment mechanisms.

SUMMARY OF THE INVENTION

According to the invention the following steps are performed.

First, a film web material excess that is defined in size and position is formed between the individual clamping bodies by simultaneously varying the pitch of the tentering chain and varying the position of the tentering clamps that hold the film web edge. The simultaneous pitch change and position change may take place in the inlet area or zone and/or in the heating zone of the apparatus.

Second, the film web is cross-stretched in the stretching zone.

Third, the positional change of the tentering clamps is removed again in the setting zone of the apparatus.

Fourth, the pitch change is removed again prior to or upon reaching the discharge zone of the apparatus, but subsequent to the release /f the film web edges by the tentering clamps, whereby the shrinking pitch t is smaller than the normal pitch T of the tentering chain. The apparatus according to the invention for performing the present method comprises the following features in combination. Two tentering chain systems having respective drive and guide wheels are arranged alongside each other, preferably in a common plane horizontally and mirror-symmetrically to a central vertical plane. The preferred common horizontal plane also coincides preferably with the plane defined by the film web. Each system comprises a tentering chain carrying a plurality of tentering clamps. In an inlet zone of the apparatus the tentering chains run in parallel to each other. In a stretching zone the tentering chains diverge from one another. In an outlet zone the tentering chains run again in parallel to each other. Each tentering chain of the system is equipped with adjustment devices for changing the chain pitch in the travel direction of the tentering chains. Additionally, the tentering clamps are constructed as tiltable tentering clamps or at least the clamping elements of the tentering clamps are arranged in a tiltable manner within the respective tentering clamp to change either the position of the entire clamp or the clamping elements, whereby pitch changes and clamp position changes are possible.

Thus, according to the invention, each tentering chain of the system is equipped with an adjustment mechanism for varying the chain pitch on the one hand and the individual clamping bodies are adapted for changing their individual position, for example, by a tilting motion in the same manner as described in the above mentioned U.S. Ser. No. 07/915,000 (Rutz). Further, the chain pitch is changed in such a way that in the inlet area or zone of the apparatus each chain has a so-called base pitch T, whereby in the inlet zone where the chain changes direction around the guide wheel, the clamping elements of each tentering clamp are in a horizontal position and thus in the plane of the incoming film web. The film web thus can be fed into the apparatus and seized by the tentering clamps without any problems. Directly after the tentering clamps have gripped the incoming film web, the tentering chains are adjusted from the base pitch T to the so-called shrinking pitch t which is smaller than the base pitch, whereby the on-center spacing between neighboring tentering clamps along the respective tentering chain is reduced. According to the invention, the position of the clamping elements of the present tentering clamps is changed simultaneously with the pitch change, for example, by tilting the clamps or clamping elements around a cross-axis which carries the clamps or clamping elements. The pitch change /r rather the spacing change between individual clamps and the positional change of the clamps in a direction other than the feed advance direction of the respective tentering chain are linked to each other directly. Both motions are so performed that no additional stretching of the film web takes place.

In the inlet zone of the apparatus the forces required for adjusting the pitch are still relatively small because no stretching forces for the biaxial stretching of the film web are yet effective on the tentering chains in this area. By superimposing two motions that happen simultaneously on each other, namely the pitch varying motion and the position varying motion, the invention achieves a corrugation of the incoming film web as it is being fed into the treatment apparatus. Thus, the film web reaches the heating zone of the apparatus already in its corrugated configuration and travels in that form also into the stretching zone. The positional resetting of the clamps or clamping elements takes place in the setting zone of the apparatus that follows the stretching zone. The shrinking takes place in the setting zone. As a result of the resetting of the position of the clamps or clamping elements, a free or loose section of the film web between two neighboring tentering clamp bodies is exposed to the shrinking process. Thus, at the inlet of the apparatus the pitch and the position are changed simultaneously. However, toward the outlet, namely in the setting zone of the apparatus, the positional change of the clamps takes place independently of the pitch change.

At the end of the setting zone the treated film web is released from the clamps. This release takes place prior to the respective clamps reaching the drive wheel of the corresponding tentering chain. When the film web has been released, the shrink pitch t is increased again to the base pitch T. Thus, the chain run that returns to the inlet section of the apparatus travels with the base pitch T. This second pitch chain thus also takes place in an area where relatively small adjustment forces are required for the intended pitch chain, because now the tension force effective on the tentering chain is effective in the same direction as the pitch increase from t to T so that the chain pulling force actually facilitates the pitch change in the increasing direction.

According to the invention the advantages are achieved that the pitch and positional changes can be effected with minimal forces so that any operational state of the apparatus is well under control. Further, wear and tear on the tentering chains and especially on the clamping elements is substantially reduced since the adjustment forces are smaller and since the adjustment forces are effective at the optimal time within the course of a chain revolution.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EMBODIMENT AND OF THE BEST MODE OF THE INVENTION

Figure 1:
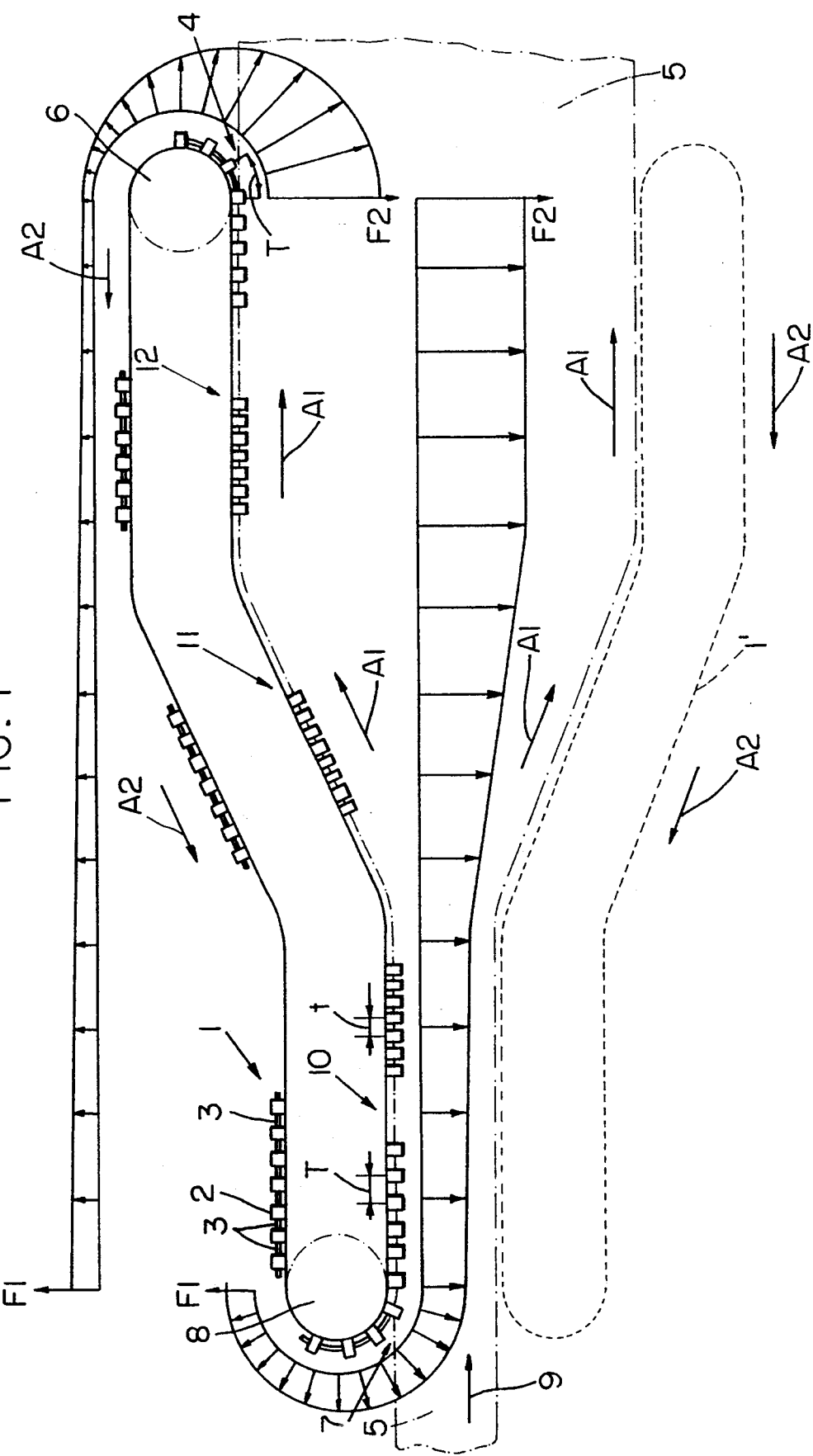
FIG. 1 is a schematic illustration of a plan view of a film treatment apparatus with tentering chains, wherein one chain is shown in full lines and the other chain is only shown in dash-dotted lines, and wherein the relative size of the forces effective on the respective tentering chain runs are illustrated by fields of arrows.

FIG. 1 shows one tentering chain 1 of the treatment apparatus in full lines, while the other tentering chain 1' of the apparatus is shown in dashed lines and not shown in further detail because the description of one chain is equally applicable to the other chain. Individual tentering clamps 2 form the chain 1 through connection and adjustment elements 3. The construction of the individual tentering clamps 2 may, for example, be the same as is disclosed in U.S. Ser. No. 07/915,000 (Rutz), the content of which is incorporated herein by reference. Either the entire tentering chain is position adjustable relative to a direction other than the chain travel direction, or each clamp is equipped with position variable clamping elements 18 and 19 as are shown, for example, in present FIG. 3. The tentering chain 1 is driven by a drive wheel 6 in the exit area or zone 4 of the film web 5. A direction reversing guide roller or wheel 8 is arranged in the inlet area or zone 7 of the film web 5 for guiding the tentering chain 1. Additional guide rollers and guide tracks are positioned in the apparatus where the tentering chains change their travel direction. Arrows A1 show the travel direction of the forward run of each tentering chain from the inlet zone 7 to the exit zone 4. Arrows A2 illustrate the travel direction of the return run from the exit zone 4 to the inlet zone 7.

Figure 3:
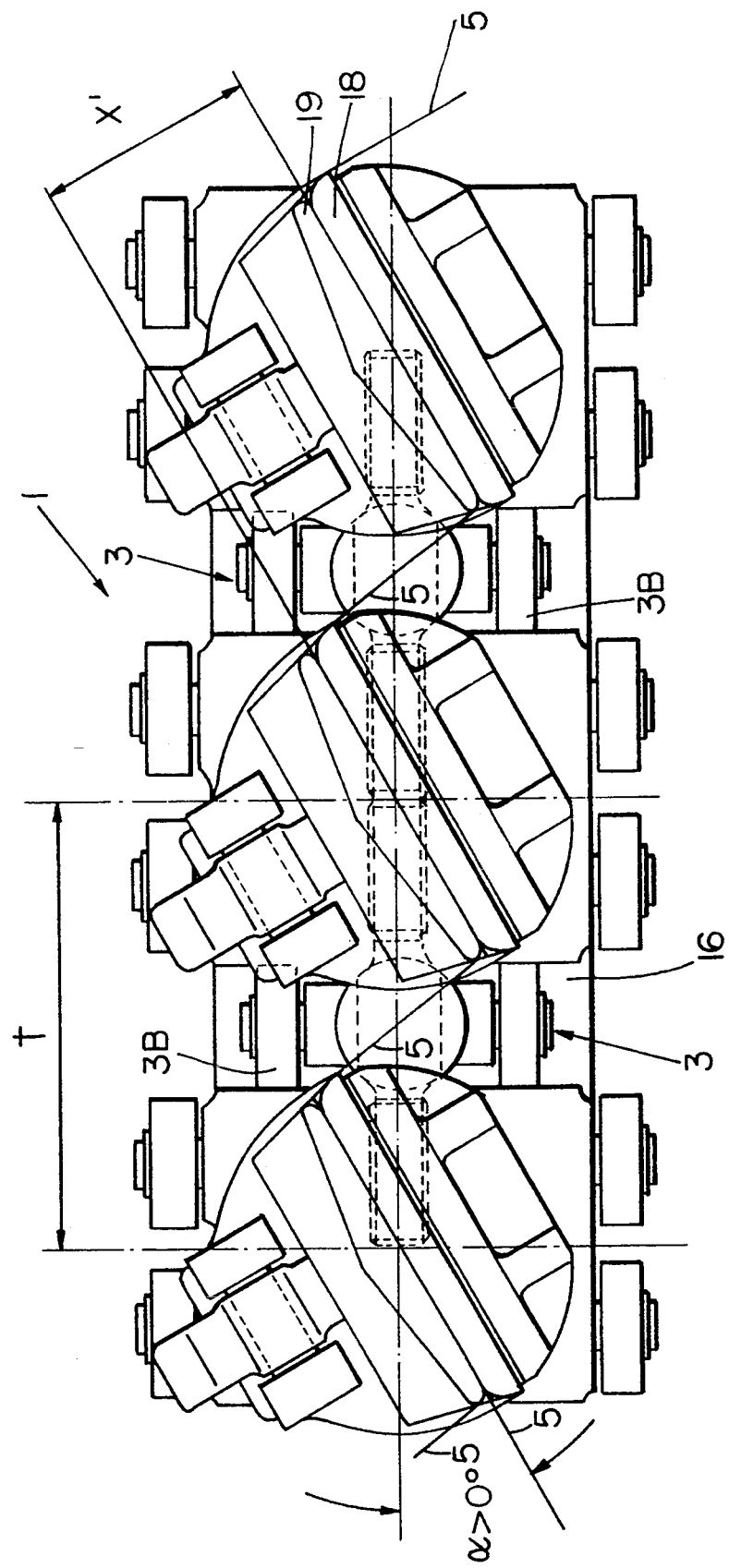
FIG. 3 is a view similar to that of FIG. 2, however, now showing a changed pitch, namely the shrinking pitch t between neighboring tentering clamps in the heating zone of the apparatus while the slating angle of the clamping elements α is larger than 0° (α>0°)
Figure 4:
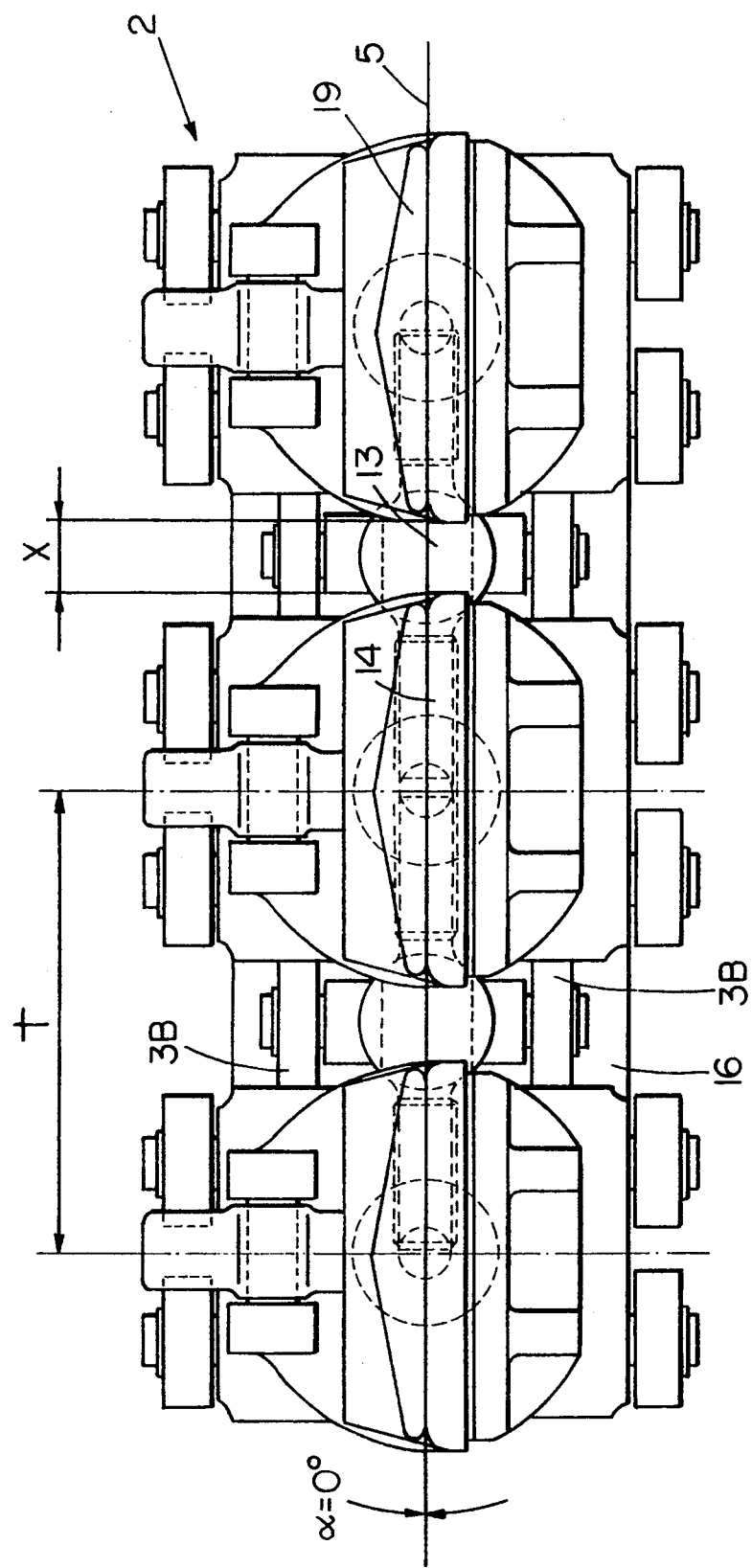
FIG. 4 is again a view similar to that of FIG. 2, showing the tentering clamps again with a slanting angle α=0, but still maintaining the shrinking pitch t between the tentering clamps in the setting range where shrinking takes place.

For treating a film web 5 in accordance with the invention, the untreated film web 5 is fed into the inlet zone 7 where the edge or rather the edges of the web 5 are gripped and clamped by the individual tentering clamps 2. As mentioned, the tentering chain 1, 1' has a base pitch T at the inlet zone 7 of the apparatus. The incoming web 5 travels in the direction of the arrow 9, and after passing the inlet zone 7 reaches the heating zone 10. In this zone a controlled pitch change from T to t of the tentering chain takes place, whereby the on-center spacing of two neighboring individual tentering clamps 2 is varied. In other words, the base pitch T is reduced by the shrinking measure x (T−x=t). According to the invention, a positional change of the clamps or of clamping elements 18, 19 of the clamps takes place simultaneously with the pitch change, whereby the clamped film edges must follow the positional change movement of the clamping elements or clamps. This positional change may be performed as a controlled tilting motion or even as a vertical displacement of the clamping elements 18 and 19. Due to the pitch change from T to t an excess or reserve length x' of film web is accumulated between neighboring tentering clamps 2 as shown in FIG. 3. This reserve length x' is taken up by the tilting or vertical displacement of the clamping elements 18 and 19. As a result of the simultaneous pitch change and positional change, the film web 5 assumes necessarily or positively a corrugated configuration and the web travels in this configuration from the heating zone 10 through the stretching zone 11 all the way into the beginning of the setting zone 12. After the tentering chain carrying the corrugated film web has passed through the stretching zone 11 and has entered into the setting zone 12, a controlled return of the positional change of the clamping elements 18 and 19 is performed, whereby the excess web length x' of the film web 5 can now be exposed to the shrinking. The shrinking of the web 5 may be performed until the previously formed length reserve x' is taken up by the shrinking operation down to the value x as shown in FIG. 4.

Upon completion of the shrinking, plane film sections 13 are present between neighboring tentering clamps 2. These film sections 13 merge seamlessly into the film sections 14 still held by the clamps as shown in FIG. 4. The film web is now released from the clamps and withdrawn from the apparatus through the outlet zone 4. Thereafter, however prior to the clamps 2 that are still spaced at the pitch t reach the drive wheel 6 another pitch change is performed to restore the larger base pitch T.

The just described operational sequence performing the steps according to the invention with the aid of a tentering chain having a pitch variability and with the aid of clamping clamps or clamping elements having a positional variability, provides the advantage that the forces necessary for the mechanical adjustment in both instances are applied when the sizes of these forces are smallest. These small forces are easily controlled and do not interfere with the proper function of the treatment apparatus altogether. Another advantage of the invention is seen in that the film web can now be fed into the treatment apparatus without any problems.

FIG. 1 illustrates the foregoing with the aid of a schematic illustration of the tension forces applied to the tentering chain during a complete revolution. $F_1$ designates the tension or pulling force applied to the tentering chain in the inlet zone 7 and in the heating zone 10 of the treatment apparatus. In these areas 7 and 10 the tension force on the tentering chain 1 is relatively low. Thus, the mechanical adjustment of the pitch from T to t can be accomplished with relatively small adjustment forces that can well be handled. The adjustment force must, however, be sufficient to overcome the chain pulling force $F_1$. During the biaxial simultaneous film web stretching operation the maximal pulling force $F_2$ is applied to the tentering chain which continues through the entire setting zone 12 and until the film web 5 is removed from the clamps. In this area the force $F_2$ is kept constant.

After the release of the web 5 by the clamps, that is after release of the film edge by the clamps 2, the mechanical readjustment of the tentering clamps 2 from the shorter pitch t to the larger base pitch T takes place. In this instance the pulling force on the tentering chain is additive to the required adjustment force and thus greatly facilitates the resetting of the connection and adjustment elements 3. After a clamping body 2 has passed the drive wheel 6 the chain pulling force returns to the force F1. However, due to the prevailing friction between the clamping bodies 2 and the web carriers, a small increase takes place as follows. $F_1 + F_R$, whereby $F_R$ is the friction force. This minor increase has, however, no mechanical influence on the pitch adjustment of the tentering chain 1 in the area of the film treatment.

Figure 2:
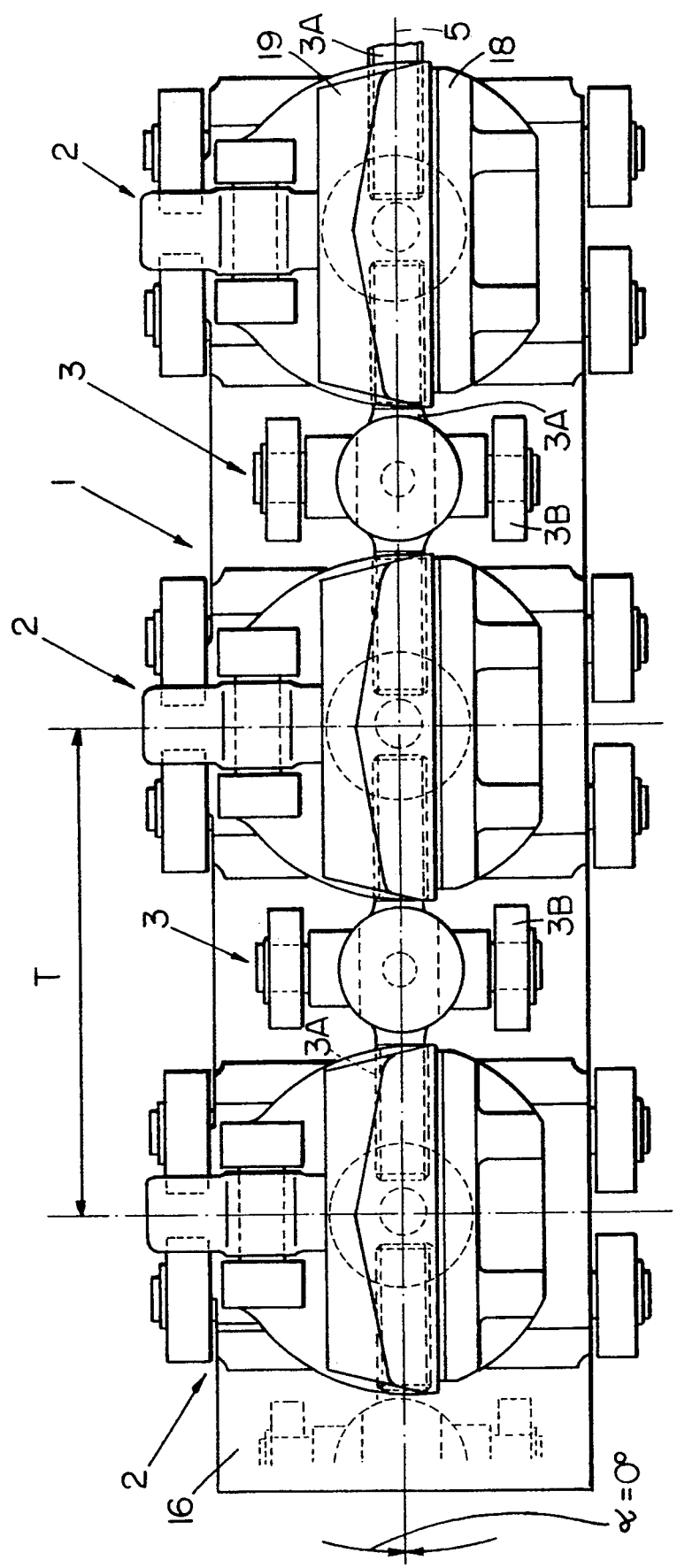
FIG. 2 is a front view, on an enlarged scale compared to FIG. 1, of a plurality of tentering clamps connected in a tentering chain, whereby each tentering clamp is equipped with position variable clamping elements having a zero slanting angle relative to the horizontal clamping plane ($\alpha=0°$) and a base pitch T between neighboring tentering clamps in the inlet zone.

FIG. 2 shows a possible embodiment of the endless tentering chain 1, 1' with its pitch variable features. Each chain comprises individual clamps 2 interconnected by a connecting element 3 which simultaneously functions as a pitch adjustment device. Details of the element 3 and its cooperation with the clamps 2 and with a control rail 16 are disclosed in U.S. Ser. No. 07/915,416 (Rutz), filed Jul. 17, 1992. The content of U.S. Ser. No. 07/915,416 is also incorporated into the present disclosure by reference. The tentering clamps of U.S. Ser. No. 07/915,416 are equipped with a position variable tentering table 18 that cooperates with a tentering flap 19. Both, the table 18 and the flap 19 constitute part of the clamping device and define an initial clamping plane in the inlet zone.

Referring further to FIG. 2, the individual clamps or rather tentering clamps 2, are interconnected by connecting elements 3 that function as pitch adjustment elements for adjusting the pitch T to t and vice versa, whereby the pitch becomes variable. T is the above-mentioned base pitch which is larger than the reduced pitch t. The operation of the threaded spindles 3A permits the variation of the pitch as described in more detail in U.S. Ser. No. 07/915,416. The threaded spindles 3A engage threaded bores in the clamp body 2. A control rail 16 which is temporarily engaged by control rollers 3B permits varying the chain pitch T. The pitch variability as employed according to the invention, however, must not necessarily be achieved by the features of U.S. Ser. No. 07/915,416. Any conventional pitch adjustment for tentering chains can be used as taught herein.

According to the invention the clamping elements 18 and 19 are also position variable in a direction other than the chain travel direction. For this purpose, the clamps 18 and 19 are tiltable about a cross-axis which is provided in the clamp body 2, but not shown in FIG. 2 in which the clamps 18 and 19 are shown in a neutral, that is in an untilted position. The film 5 is held between the clamp table 18 and the clamp flap 19 of each clamp 2. This is the operational state of the tentering chains just immediately after completion of the seizing or clamping of the film web 5 by the tentering clamps 2 in the inlet zone 7.

FIG. 3 shows the state of the tentering chain according to the invention with the reduced pitch t that is effective in the inlet zone 7 or in the heating zone 10 of the film stretching apparatus. The connecting and adjustment elements 3 have varied the pitch from T to t in response to the temporary cooperation between the guide rollers 3B and the guide rail 16. Simultaneously, a tilting of the clamp bodies takes place, whereby the film 5 is corrugated as seen in FIG. 3. As shown, all clamps, or rather the clamps elements 18, 19, are tilted in the same direction by the angle $\alpha$ that now becomes larger than 0. In FIG. 2 the angle $\alpha$ is 0. However, the tilting of the clamping elements 18, 19 of one clamp relative to the respective elements in the neighboring clamp can take place in opposite directions. Thus, the left and right-hand clamps in FIG. 3 may be tilted as shown, whereas the central clamp in FIG. 3 may be tilted so that the clamping plane slants downwardly from left to right rather than upwardly as shown.

As a result of the just described tilting, an excess length X' of film web 5 is provided between two neighboring clamping bodies 2. This excess film length X' is thus properly stretched when the clamps are shown in the position of FIG. 3. As a result, it has been found by practical experiments that the corrugated shape of the film is achieved throughout the width of the film web and not only along the edges. The just described shrinking pitch t of the tentering chain and the changed or tilted position of the clamping elements 18, 19 of the clamps 2 and thus the corrugated shape of the film web 5 are maintained throughout the travel through the stretching zone 11 until the web reaches the beginning of the setting zone 12.

With the entry of the corrugated film web 5 into the setting zone 12 the tilted position of the clamping elements 18, 19 is controlled so that the clamping elements return into the position shown in FIG. 2. Thereafter, the film web 5 is exposed to the shrinking operation in the setting zone 12. The shrinking takes place until the film web 5 has shrunk to take up the difference between T and t.

FIG. 4 shows the completed shrinking of the film web 5 in the setting zone 12. The film web 5 in its shrunk state is now a plane film web. After passing through the setting zone 12, that is after completion of the shrinking, the film web 5 is released by operating the clamp flap 19 of the respective clamp 2. At this time, the control rollers 3B again engage the control rail 16, whereby the tentering chain pitch t is increased again to the base pitch T.

The combination of the chain pitch change with the positional or tilting variation of the clamps or the clamp elements 18, 19, as taught by the invention, makes certain that a sufficient length of free film web 5 between neighboring clamps is provided for the shrinking.

The term "tentering clamp" is intended to cover the entire clamping mechanism and/or merely the clamp table and clamp flap which are mentioned above as clamp elements 18, 19.

Although the invention has been described with reference to specific example embodiments, it will be appreciated that it is intended to cover all modifications and equivalents within the scope of the appended claims.

What I claim is:

1. A method for shrinking a biaxially stretched thermoplastic film in a treatment apparatus having two tentering chains arranged in a common plane, said tentering chains defining an inlet zone, a heating zone, a stretching zone, a setting zone, and an outlet zone in that order as viewed in the travel direction of said thermoplastic film, said tentering chains carrying tentering clamps for gripping an edge of said thermoplastic film as it enters said inlet zone and for carrying said thermoplastic film through said treatment apparatus, said method comprising the following steps:
    (a) gripping said thermoplastic film with said tentering clamps as said thermoplastic film enters said inlet zone of said apparatus,
    (b) varying a pitch between neighboring tentering clamps, whereby a first on-center spacing (T) between neighboring tentering clamps is reduced in said travel direction to a second on-center spacing (t),
    (c) simultaneously varying a starting position of said tentering clamps in a positional change direction other than said film travel direction whereby said tentering clamps assume a varied position so that an excess film length is provided that is defined in its size and position,
    (d) cross-stretching said thermoplastic film in said stretching zone,
    (e) changing said varied position of said tentering clamps back to said starting position in said setting zone, (f) releasing said thermoplastic film from said tentering clamps, and (g) returning said on-center spacing (t) back to said first on-center spacing (T).

2. The method of claim 1, wherein said simultaneous varying of said pitch and of said starting position of said tentering clamps is performed in said inlet zone.

3. The method of claim 1, wherein said simultaneous varying of said pitch and of said starting position of said tentering clamps is performed in said heating zone.

4. The method of claim 1, wherein said step (g) of returning said second on-center spacing (t) to said first on-center spacing (T) is performed after said releasing step and prior to said tentering clamps entering said outlet zone of said treatment apparatus.

5. The method of claim 1, wherein said step of returning said second on-center spacing (t) to said first on-center spacing (T) is performed after said releasing step in said outlet zone.

6. The method of claim 1, wherein said step of varying said starting position and said step of changing said varied position is performed by a tilting motion of said tentering clamps.

7. The method of claim 1, wherein said step of varying said starting position and said step of changing said varied position of said tentering clamps is performed by a shifting motion in said positional change direction and in an opposite positional change direction.

8. The method of claim 1, wherein said step of varying said starting position and said step of changing said varied position is performed by superimposing a tilting motion and a shifting motion on each other for positioning said tentering clamps.

9. The method of claim 1, wherein said varied position is maintained for a first duration that is a proportion of the time corresponding to one full revolution of said tentering chains.

10. The method of claim 9, wherein said second on-center spacing (t) is maintained for a second duration that is longer than said first duration.

11. An apparatus for shrinking a biaxially stretched thermoplastic film in a treatment apparatus, comprising two tentering chains arranged in a common plane, said tentering chains defining an inlet zone, a heating zone, a stretching zone, a setting zone, and an outlet zone in that order as viewed in a film travel direction of said thermoplastic film, said tentering chains carrying tentering clamps for gripping each edge of said thermoplastic film as it enters said inlet zone and for carrying said thermoplastic film through said treatment apparatus, said apparatus further comprising first means for varying a pitch between neighboring tentering clamps, whereby a first on-center spacing (T) between neighboring tentering clamps is reduced in said travel direction to a second on-center spacing (t), second means for simultaneously varying a starting position of said tentering clamps in a positional change direction other than said film travel direction whereby said tentering clamps assume a varied position so that an excess film length is provided that is defined in its size and position, third means for cross-stretching said thermoplastic film in said stretching zone, fourth means for changing said varied position of said tentering clamps back to said starting position in said setting zone, fifth means for releasing said thermoplastic film from said tentering clamps, and sixth means for returning said second on-center spacing (t) back to said first on-center spacing (T).

12. The apparatus of claim 11, wherein said tentering clamps comprise a clamp table and a clamp flap cooperating with each other for holding said thermoplastic film, said clamp table and said clamp flap defining an initial clamping plane corresponding to an inlet plane of said thermoplastic film, said apparatus further comprising means for varying an elevation of said initial clamping plane relative to said inlet plane.

13. The apparatus of claim 11, wherein said tendering clamps comprise a clamp table and a clamp flap cooperating with each other for holding said thermoplastic film, and means for tilting said clamp table and flap about an axis extending in parallel to said film travel direction.

* * * * *